United States Patent Office.

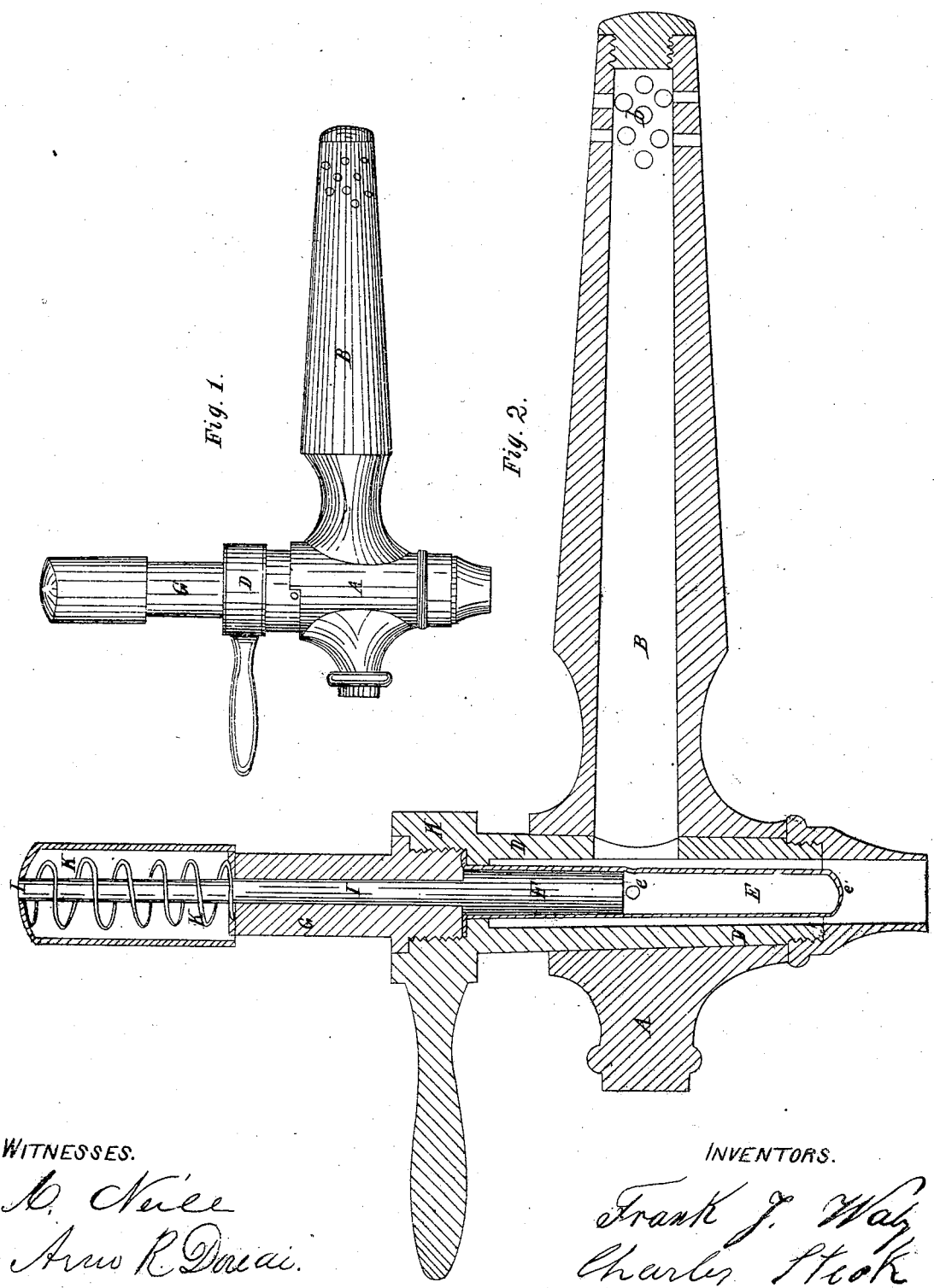

FRANK J. WALZ AND CHARLES STECK, OF HUDSON, NEW JERSEY.

Letters Patent No. 75,085, dated March 3, 1868.

IMPROVEMENT IN BEER-FAUCETS.

The Schedule referred to in these Letters Patent and making part of the same.

TO ALL WHOM IT MAY CONCERN:

Be it known that we, FRANK J. WALZ and CHARLES STECK, both of the city and county of Hudson, State of New Jersey, have invented an Improved Air-Cock; and do hereby declare that the same is fully described and represented in the following specification and the accompanying drawings, of which—

Figure 1 is an elevation on a reduced scale, and

Figure 2 a longitudinal and vertical section.

The nature of our invention consists in constructing a beer or ale-cock in such a manner that as the beer or ale is drawn from the barrel, the cock, by means of an air-pump or plunger contained in it, will force air into and agitate the beer or ale, thereby causing the old as well as new beer or ale to foam and produce a rich, creamy surface.

The construction of our invention is as follows: The accompanying drawings represent an ordinary cock, of which A is the valve-seat, with arm B, which enters the beer-barrel, and having on its end a rose or series of perforations, $b$, through which the liquor enters the cock. D is the valve. The air-pump is placed within the valve D, of which E is the pump-barrel, resting on the valve D. This barrel E is smaller in diameter than the interior, $d$, of the valve D, and has circular openings, $e$, about midway of its height, through which the air and beer enter the barrel E of the pump, while, at its lower end, the said barrel is perforated with numerous fine holes, $e'$, through which the air and beer are expelled by the plunger F. The plunger-rod I is encircled by a tubular guide, G, which is screwed into the valve at H, while attached to its upper end is a spiral spring, K, by means of which, and the finger of the tapster, the plunger F is operated. The plunger F snugly fits the barrel E, and is of such length as to cover the perforations, $e$ $e$, at all times, except when raised to its full height, so that no beer or liquor shall enter the barrel above it.

Having described the nature and construction of our invention, we will now describe its operation.

The cock being placed in the beer-barrel, and it is desired to draw off the beer, the valve D is turned in the proper direction. Now, as the beer flows through the space $d$, between the pump-barrel E and the valve D, a portion of the flowing beer and air contained therein will enter the pump-barrel at $e$. The tapster, by placing his finger on the top of the plunger-rod I, and pressing the plunger downwards, the air and beer contained in the pump-barrel E will be driven forth through the perforations, $e'$, in numerous fine streams, while, on removing his finger, the plunger is carried upwards by means of the spiral spring K, the pump-barrel E receiving another charge on its return stroke. And this operation, performed in quick succession, agitates the air and beer, causing the ale or beer to foam, and thus we produce a rich, creamy surface on old or new ale and beer as it is drawn from the barrel into a vessel.

Having described our invention, what we claim, and desire to secure by Letters Patent, is—

The combination of the pump-barrel E, having side and end-perforations $e$ and $e'$, the plunger F and spring K, arranged and operating in connection with the faucet, so as to commingle air with the liquor during its discharge, substantially as and for the purpose herein specified.

In testimony whereof, we have hereunto set our signatures.

FRANK J. WALZ,
CHARLES STECK.

Witnesses:
A. NEILL,
ARNO R. DOUAI.